United States Patent
Dolas et al.

(10) Patent No.: US 10,339,131 B1
(45) Date of Patent: Jul. 2, 2019

(54) FAULT PREVENTION

(71) Applicant: Hortonworks Inc., Santa Clara, CA (US)

(72) Inventors: Sheetal Dinkar Dolas, Sunnyvale, CA (US); Paul Daniel Codding, Richfield, MN (US)

(73) Assignee: Hortonworks, Inc., Santa Clara, CA (US)

( * ) Notice: Subject to any disclaimer, the term of this patent is extended or adjusted under 35 U.S.C. 154(b) by 193 days.

(21) Appl. No.: 15/620,734

(22) Filed: Jun. 12, 2017

Related U.S. Application Data

(60) Provisional application No. 62/348,471, filed on Jun. 10, 2016.

(51) Int. Cl.
*G06F 16/00* (2019.01)
*G06F 16/23* (2019.01)
*G06F 11/00* (2006.01)
*G06F 16/182* (2019.01)
*G06F 16/18* (2019.01)

(52) U.S. Cl.
CPC ........ *G06F 16/2365* (2019.01); *G06F 11/004* (2013.01); *G06F 16/182* (2019.01); *G06F 16/1865* (2019.01); *G06F 16/2379* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 7,434,105 B1 * | 10/2008 | Rodriguez-Rivera | ...................... G06F 11/073 714/38.1 |
| 2009/0024818 A1 * | 1/2009 | Yamada | .............. G06F 12/0253 711/170 |
| 2012/0198200 A1 * | 8/2012 | Li | ........................... G06F 3/061 711/171 |

OTHER PUBLICATIONS

M. Harman et al., "Less is more: Temporal fault predictive performance over multiple Hadoop releases," International Symposium on Search Based Software Engineering, Aug. 2014, pp. 240-246.

* cited by examiner

*Primary Examiner* — Son T Hoang
(74) *Attorney, Agent, or Firm* — Fish & Richardson P.C.

(57) ABSTRACT

Methods, systems, and apparatus, including computer programs encoded on computer storage media, for identifying a plurality of software components within a cluster of computing nodes, each component operating on one or more respective nodes within the cluster to process a workload; determining, for each identified component, a respective resource usage trend for the component having a respective range of predicted values; comparing, for each identified component, the respective range of predicted values to a respective range of suitable values; and generating, for each component with the respective range of predicted values that is outside of the respective range of suitable values, a respective recommendation for configuring the component to cause the component to generate an updated respective resource usage trend having an updated respective range of predicted values that are inside of the respective range of suitable values.

9 Claims, 1 Drawing Sheet

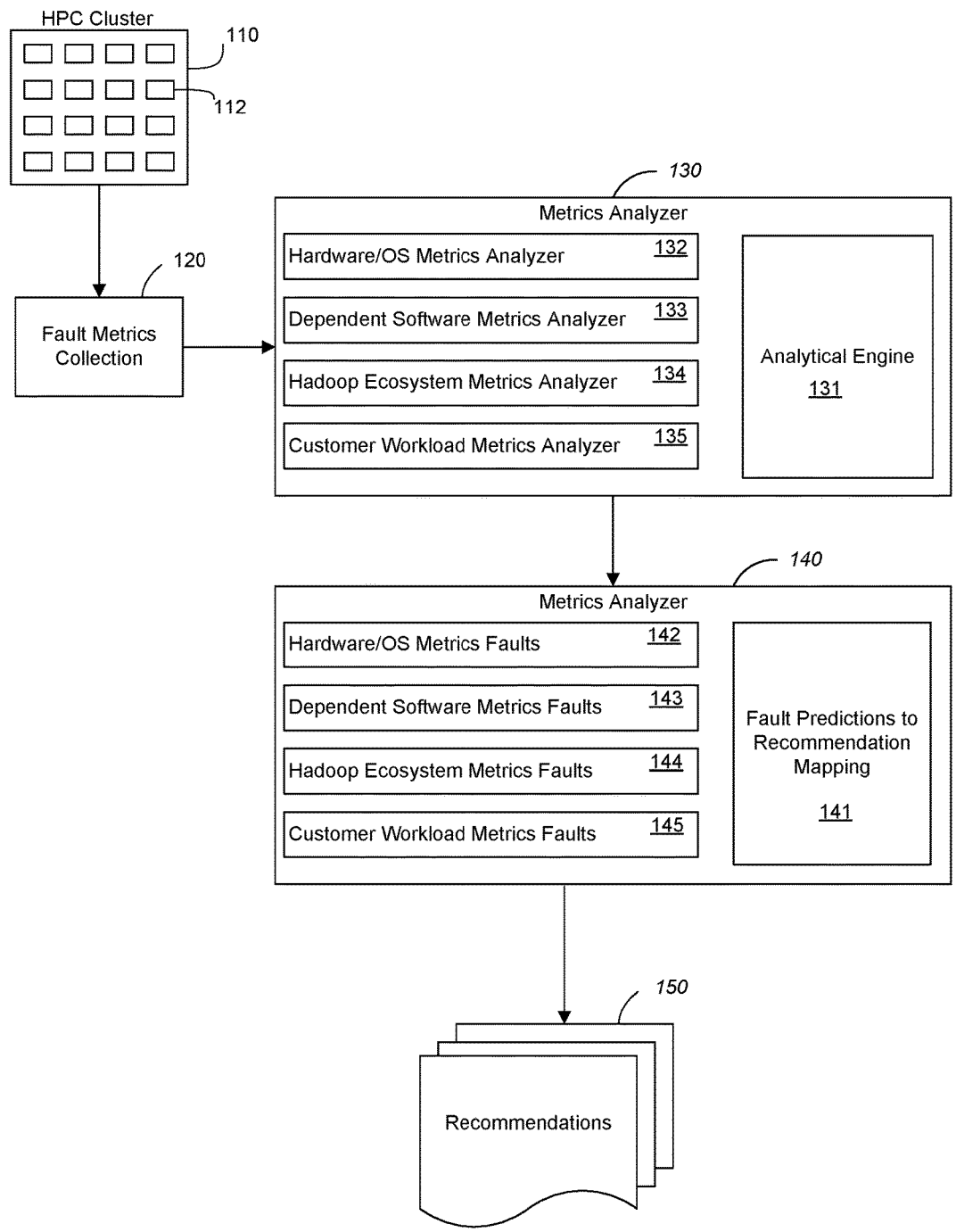

FAULT PREVENTION

BACKGROUND

This specification relates to fault prevention in a computer cluster.

A framework, e.g., Apache Hadoop, can be deployed to manage distributed storage and distributed processing of large data sets on clusters of many computers, i.e., nodes, which may be physical or virtual. Oftentimes, the computers are built from commodity hardware. The framework can include multiple components to be run on different nodes in the cluster. Each component can be responsible for a different task. For example, a first component, e.g., Hadoop Distributed File System (HDFS), can implement a file system, and a second component, e.g., Hive, can implement a database access layer. The components work together to distribute processing of a workload of files amongst nodes in the cluster.

A cluster of computers running the framework is highly scalable. Additional nodes can be added to the cluster to increase throughput. Each cluster can also be highly resistant to failure because data can be copied to multiple nodes in the cluster in case one or more nodes fail.

SUMMARY

In general, this specification describes a system for fault prevention in a computer cluster.

In general, one innovative aspect of the subject matter described in this specification can be embodied in methods that include the actions of identifying a plurality of software components within a cluster of computing nodes, each component operating on one or more respective nodes within the cluster to process a workload, each component utilizing at least one of the following resources of the one or more respective nodes: storage, processing power, memory, or disk input and output operations; determining, for each identified component, a respective resource usage trend for the component having a respective range of predicted values, the respective resource usage trend determined from current and historical usages of the resources of the one or more respective nodes when processing the workload; comparing, for each identified component, the respective range of predicted values to a respective range of suitable values; and generating, for each component with the respective range of predicted values that is outside of the respective range of suitable values, a respective recommendation for configuring the component to cause the component to generate an updated respective resource usage trend having an updated respective range of predicted values that are inside of the respective range of suitable values.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. Tools can analyze Hadoop metrics across the stack, predict potential faults and recommend remediation to mitigate risks. A system can understand the specifics of a Hadoop ecosystem and predict faults and recommend remediation action steps. Understanding that a fault may occur is helpful and providing specific recommendations to prevent that fault from occurring is valuable. Users can be presented with prescriptive recommendations to prevent future faults from occurring.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWING

The FIGURE shows an example architecture for a fault prevention system.

Like reference numbers and designations in the various drawings indicate like elements.

DETAILED DESCRIPTION

Hadoop is a highly scalable distributed computing and storage platform that supports multiple deployment configurations and hardware environments. Due to this, many factors, environment, configuration, and workload can cause system outages and failures.

This specification describes a system that can take many disparate data points produced by a Hadoop platform's environment and user-based workloads, and based on them provide advanced analytics that predict faults before they occur and provide recommended remediation steps.

The FIGURE shows an example architecture for a fault prevention system. A collection of fault metrics are collected 120 from a cluster 110 of computer nodes 112 and sent to a metrics analyzer 130. The metrics analyzer determines projections of what types of faults may occur at the cluster using the collected fault metrics. The metrics analyzer includes an analytical engine 131, a hardware/OS metrics analyzer 132, a dependent software metrics analyzer 133, a Hadoop ecosystem metrics analyzer 134, and a customer workload metrics analyzer 135.

The metrics analyzer sends the determination to a recommendation engine 140, which generates recommendations 150 of changes to prevent the faults from occurring at the cluster. An example recommendation is to change a particular hard disk drive from a particular node in the cluster. The recommendation engine 140 includes a fault predictions to recommendation mapping 141, data for hardware/OS metrics faults 142, data for dependent software metrics faults 143, data for Hadoop ecosystem metrics faults 144, and data for customer workload metrics faults 145.

Examples of common fault prediction calculations and recommendations will be described for the following situations: running out of storage capacity, running out of compute/processing capacity, increasing risk of missing service level agreements (SLA) commitments, unfavorable job execution durations trends, unfavorable HBase read/write latency trends, unfavorable Storm event processing latencies and throughput, risk of long recovery times, disks approaching end of life, platform components approaching end of life, potential faults and slowness in key services, Java Virtual Machine garbage collection pauses for key services, increasing number of metadata objects managed by single instance, and trends approaching static limits.

The system generates predictions and their associated recommendations based off of the following aggregated data.

For HDFS, over a previous period, e.g., 6 to 12 months, the fault prevention system gathers data specifying total HDFS usage, how many transactions, a replication factor, a number of files and directories and blocks, a number of snapshots, a number of I/O (input or output) operations across all data nodes, size of I/O operations across all data nodes in terms of data transferred, and create, write, read operation latencies.

For YARN, over a previous period, e.g., 6 to 12 months, the system gathers data specifying a total number of jobs, a total number of containers, a total number of containers per node, CPU consumed by all jobs, and memory blocked/consumed by all jobs.

For HBase, the system gathers data specifying a number of tables, and for each table, how many regions it has, how many operations are performed on it, and an average operation latency, e.g., for PUT, GET, SCAN operations.

For hardware profiles, the system gathers data specifying how many cluster nodes the cluster has, and for each node, how many CPUs and/or cores, trending usage over a time period, e.g., 6 to 12 months, how many and what type of disks and trending usage (disk throughput) over a time period (e.g., 6 to 12 months), an amount, type, and configuration of physical memory and trending usage over a time period (e.g., 6 to 12 months), how many and what type of network interface cards, how many and what type of storage controllers, and operating system configurations.

For MapReduce jobs, the system gathers the following execution details over a period, e.g., the previous 6 to 12 months: statistics for each task of the job, e.g., start time, end time, counters, metrics, rows processed, data size processed, data locality, and task queue wait times. The system also gathers data specifying resources used by job, CPU requested and used, memory requested and used, disk I/O requested and used, and network I/O requested and used.

For Hive/Tez jobs, the system gathers the following execution details over a previous 6 to 12 months: statistics for each task of the job, e.g., start time, end time, counters, metrics, rows processed, data size processed, data locality, and task queue wait times. The system also gathers data specifying resources used by job, CPU requested and used, memory requested and used, disk I/O requested and used, network I/O requested and used, and Storm usage over a period, e.g., over last 6 to 12 months. The system also gathers data specifying, for the cluster, a number of topologies, a number of workers, a number of tasks per workers, tuple processing latency by topology, throughput by topology, and failures of tasks, workers, and supervisors.

For each key metric, a trend is created for each time interval. The trend can be a data representation of usage or utilization of the key metric over the time interval. Specific metrics are associated with an analytical process to best predict future values for the next time interval.

Each metric is associated with a range of suitable values for the next time interval. The system compares the predicted values for the next interval with the suitable values, and if the prediction is outside of the suitable values, a fault is generated.

Each key metric is associated with a set of recommendations to remediate faults that are associated with that metric. The set of recommendations can be stored in a data repository. The data repository can also store a range of suitable values for each metric.

Recommendations are associated with specific triggers that are associated with each fault. If a fault is generated because the predicted values are higher than the suitable values, a specific recommendation targeted at the "above suitable range" trigger is evaluated and a recommendation specific to this occurrence is produced. Recommendations can be associated to different types of fault triggers: 1) above suitable range, 2) below suitable range, 3) unchanged, 4) no predicted valuable available.

The process of identifying cluster-specific suitable values per metric is based on analysis of component configuration, and metric-specific formulas. These metric-specific formulas are stored, e.g., in a database connected to the cluster. Conveniently, they can be updated and deployed to customer sites over time as they are improved based on feedback and field use.

For example, to identify suitable values for an HDFS NameNode heap size over the next x months, the system uses
- a number of predicted directories over the next x months (D),
- a number of predicted file over the next x months (F),
- a number of predicted blocks over the next x months (B),
- a number of predicted snapshot objects over the next x months (S),
- a size per metadata object (O),
- a number of transactions (T),
- average memory needed per transaction (M),
- memory needed for transactions (TM=T*M), and
- memory needed for all metadata objects (MD=(D+F+B+S)*O) to recommend a heap size needed for NameNode:

Heap Size Recommendation=(MD+TM)*1.2.

For each metric, specific configuration properties and system components are associated as a way to remediate the specific fault/trigger combination. Based on the fault, the type of trigger and the metric, the recommendation identifies specific component property configuration suggestions.

For example, a metric-specific formula for predicting long garbage collection (GC) pauses can be a linear regression of max GC time per day over a preceding period, e.g., the last 6 to 12 months. A metric-specific formula for predicting storage capacity exhaustion can be a linear regression of HDFS storage utilization over a preceding period, e.g., the last 6 to 12 months. A metric-specific formula for predicting SLA violations can be a linear regression of job execution durations over a preceding period, e.g., the last 6 to 12 months.

For each fault that is predicted, a recommendation is produced outlining potential risk involved, anticipated time of risk becoming reality, the remediation steps and suggested configuration changes per component to mitigate the risk.

For example, when running out of capacity, the system sends a notification of upcoming risk and anticipated time of risk becoming reality. The system recommends the following preventive measures: recommendations on tuning heap sizes for services like NameNode, ResourceManager, HiveServer, Hive metastore, and recommendations on hardware expansion.

When a risk of missing SLAs increases, the system sends a notification of upcoming risk and anticipated time of risk becoming reality. The system recommends the following preventative measures. For HBase, the system recommends platform tuning for split regions, compact regions, and tune configurations. For Storm, the system generates topology tuning recommendations and scaling recommendations, e.g., increase in workers, supervisors, and parallelism. For YARN, the system generates queue configuration recommendations, resource allocations, scaling recommendations, e.g., adding more resources to the cluster, and advanced feature utilization/upgrade suggestions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, performed by at least one computing device, comprising:
   receiving metrics from a cluster of computer nodes relating to a heap size of a NameNode of a Hadoop Distributed File System on the cluster, the metrics including
      a number of directories over a preceding period,
      a number of predicted files over the preceding period,
      a number of predicted blocks over the preceding period,
      a number of predicted snapshot objects over the preceding period,
      a size per metadata object (O),
      a number of transactions (T), and
      an average memory needed per transaction (M);
   predicting, by linear regression, corresponding values for the received metrics over a future period, the corresponding values including
      a number of directories over the future period (D),
      a number of predicted files over the future period (F),
      a number of predicted blocks over the future period (B), and
      a number of predicted snapshot objects over the future period (S);
   determining a value for the heap size of the NameNode over the future period, including
      computing an amount of memory MD needed for the metadata objects according to MD=(D+F+B+S)*O,
      computing an amount of memory TM needed for the number of transactions according to TM=T*M, and
      computing the value for the heap size as MD+TM times a safety factor; and
   outputting fault preventive recommendations based at least on the determined value for the heap size.

2. The method of claim 1, wherein the safety factor is 1.2.

3. The method of claim 1, wherein the preceding period is six months or twelve months.

4. A system comprising a cluster of computer nodes running a Hadoop Distributed File System, the system comprising:
   at least one hardware computing device;
   a metrics analyzer configured to be executing by the at least one hardware computing device to perform operations comprising:
      receiving metrics from the cluster of computer nodes relating to a heap size of a NameNode of the Hadoop Distributed File System on the cluster, the metrics including
         a number of directories over a preceding period,
         a number of predicted files over the preceding period,
         a number of predicted blocks over the preceding period,
         a number of predicted snapshot objects over the preceding period,
         a size per metadata object (O),
         a number of transactions (T), and
         an average memory needed per transaction (M);
   a recommendation engine configured to be executing by the at least one hardware computing device to perform operations comprising:
   predicting, by linear regression, corresponding values for the received metrics over a future period, the corresponding values including
      a number of directories over the future period (D),
      a number of predicted files over the future period (F),
      a number of predicted blocks over the future period (B), and
      a number of predicted snapshot objects over the future period (S);
   determining a value for the heap size of the NameNode over the future period, including
      computing an amount of memory MD needed for the metadata objects according to MD=(D+F+B+S)*O,
      computing an amount of memory TM needed for the number of transactions according to TM=T*M, and
      computing the value for the heap size as MD+TM times a safety factor; and
   outputting fault preventive recommendations based at least on the determined value for the heap size.

5. The system of claim 4, wherein the safety factor is 1.2.

6. The system of claim 4, wherein the preceding period is six months or twelve months.

7. A non-transitory medium storing computer program instructions configured to cause a system to perform operations comprising:
   receiving metrics from a cluster of computer nodes relating to a heap size of a NameNode of a Hadoop Distributed File System on the cluster, the metrics including
      a number of directories over a preceding period,
      a number of predicted files over the preceding period,
      a number of predicted blocks over the preceding period,
      a number of predicted snapshot objects over the preceding period,
      a size per metadata object (O),
      a number of transactions (T), and
      an average memory needed per transaction (M);
   predicting, by linear regression, corresponding values for the received metrics over a future period, the corresponding values including
      a number of directories over the future period (D),
      a number of predicted files over the future period (F),
      a number of predicted blocks over the future period (B), and
      a number of predicted snapshot objects over the future period (S);
   determining a value for the heap size of the NameNode over the future period, including
      computing an amount of memory MD needed for the metadata objects according to MD=(D+F+B+S)*O, computing an amount of memory TM needed for the number of transactions according to TM=T*M, and computing the value for the heap size as MD+TM times a safety factor; and outputting fault preventive recommendations based at least on the determined value for the heap size.

8. The non-transitory medium of claim 7, wherein the safety factor is 1.2.

9. The non-transitory medium of claim 7, wherein the preceding period is six months or twelve months.

* * * * *